United States Patent [19]

McClintic et al.

[11] 4,036,375
[45] July 19, 1977

[54] BIN DESTACKER AND RESTACKER

[75] Inventors: Wayne L. McClintic, Riverside, Calif.; Charles E. Sheetz, Woodstock, Va.

[73] Assignee: FMC Corporation, San Jose, Calif.

[21] Appl. No.: 650,814

[22] Filed: Jan. 20, 1976

[51] Int. Cl.² .............................................. B65G 57/09
[52] U.S. Cl. ................................. 214/6 F; 198/486; 198/489; 214/1 BD; 214/8.5 C; 214/147 T
[58] Field of Search ................... 214/6 E, 6 EA, 6 G, 214/8.5 C, 1 BA, 1 BD, 147 T, 148; 198/485, 486, 489, 490

[56] References Cited
U.S. PATENT DOCUMENTS

| 1,786,608 | 12/1930 | Halstead | 214/147 T |
| 2,697,529 | 12/1954 | Hubbell et al. | 214/147 T |
| 3,182,813 | 5/1965 | Goodell et al. | 214/1 BD |
| 3,617,054 | 11/1971 | Schilling | 214/1 BD X |
| 3,836,017 | 9/1974 | Bargstedt | 214/6 FS |

FOREIGN PATENT DOCUMENTS 1,907,763  9/1970  Germany

Primary Examiner—L. J. Paperner
Attorney, Agent, or Firm—R. S. Kelly; C. E. Tripp

[57] ABSTRACT

Means for destacking or restacking sequences of bins wherein the bins are transferred serially from their initial position to their final desired position by clamping assemblies located at the outer end of pivot arms, the pivot arms being capable both of vertical translation and of rotation while maintaining the vertical orientation of the bin being transferred. One or more photosensing devices is used to properly position the pivot arms and associated clamping assemblies relative to the uppermost bin in the stack to be transferred.

3 Claims, 11 Drawing Figures

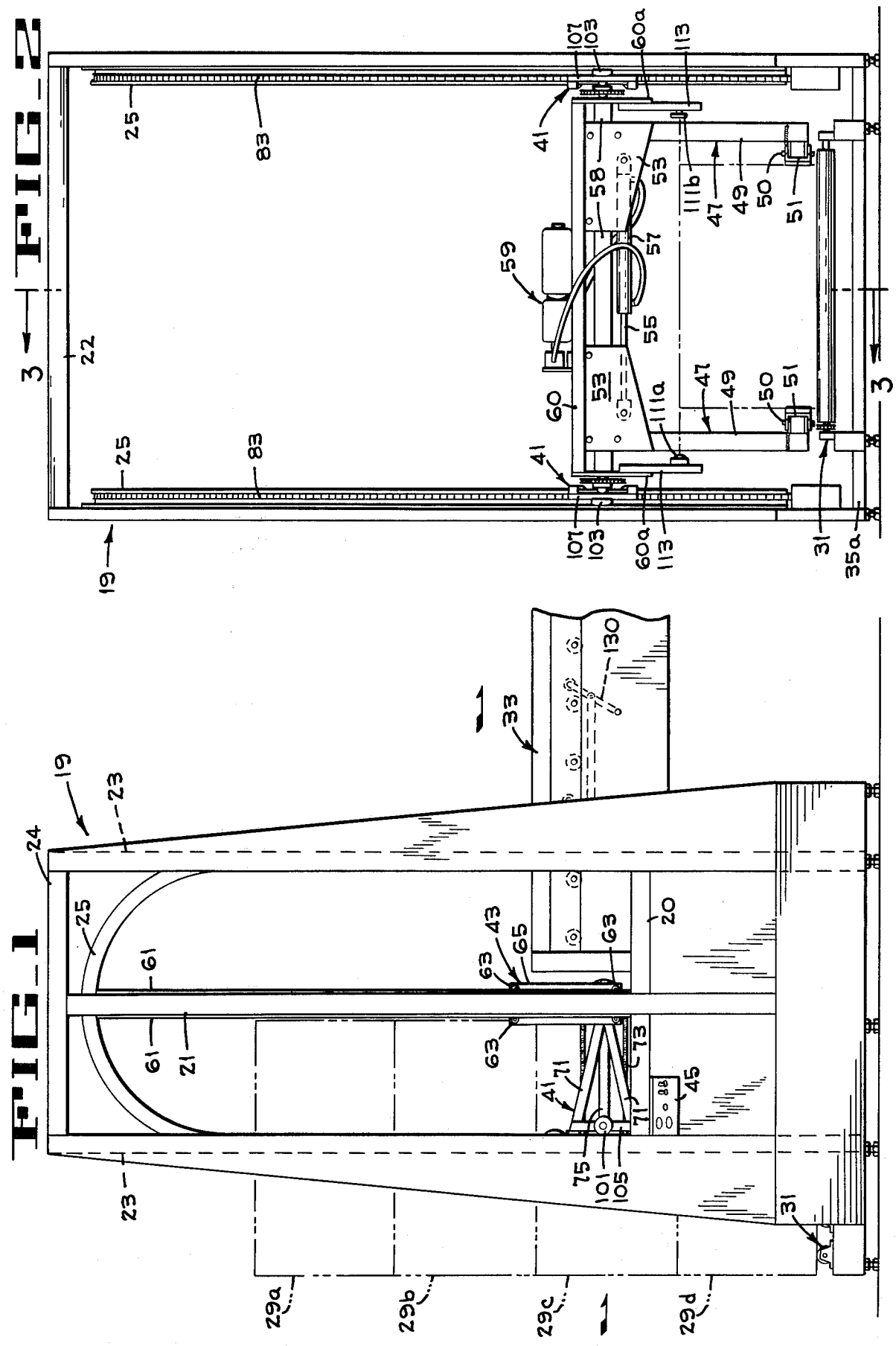

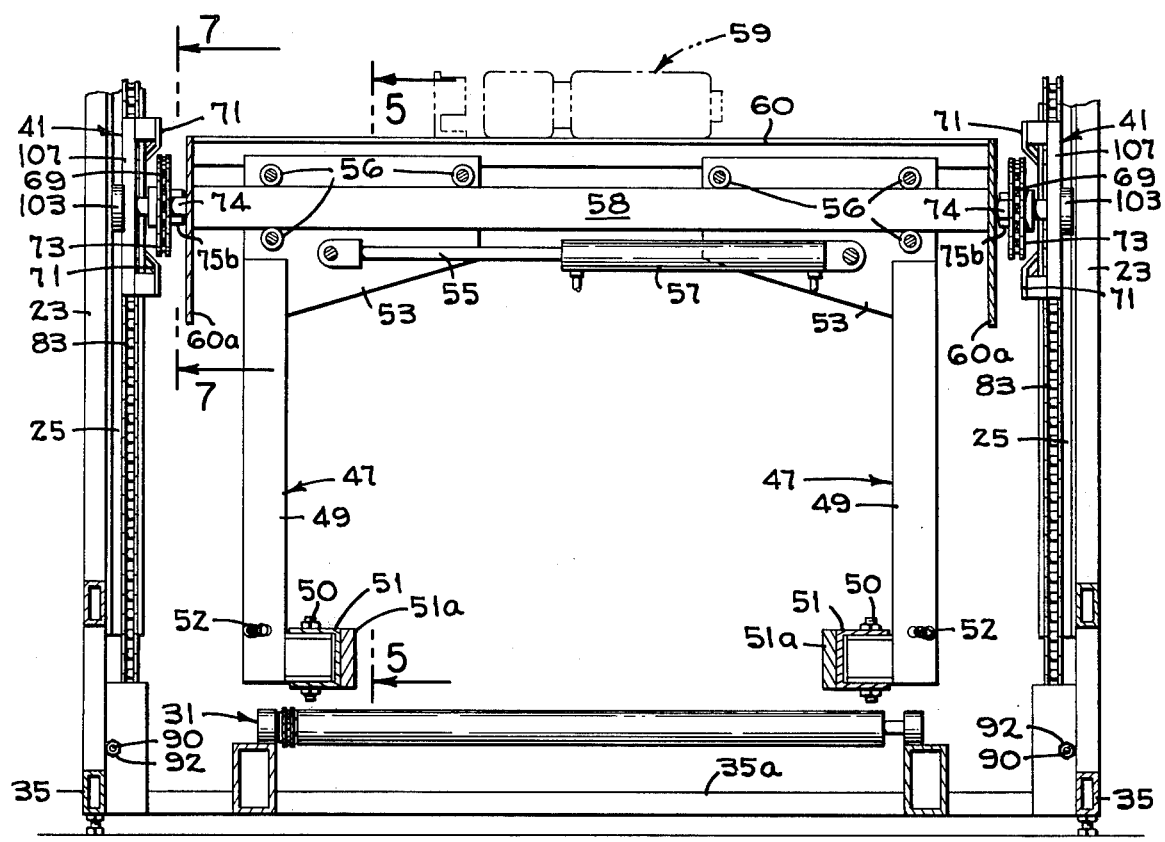
FIG_4
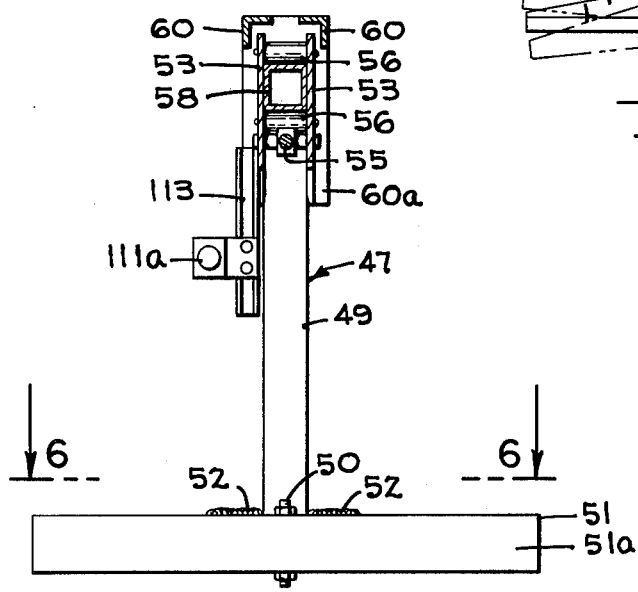
FIG_5
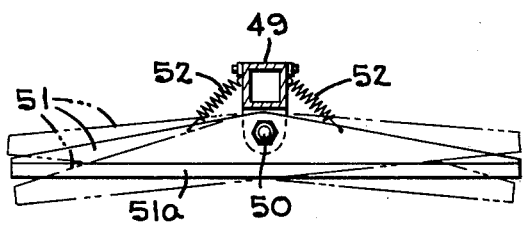
FIG_6

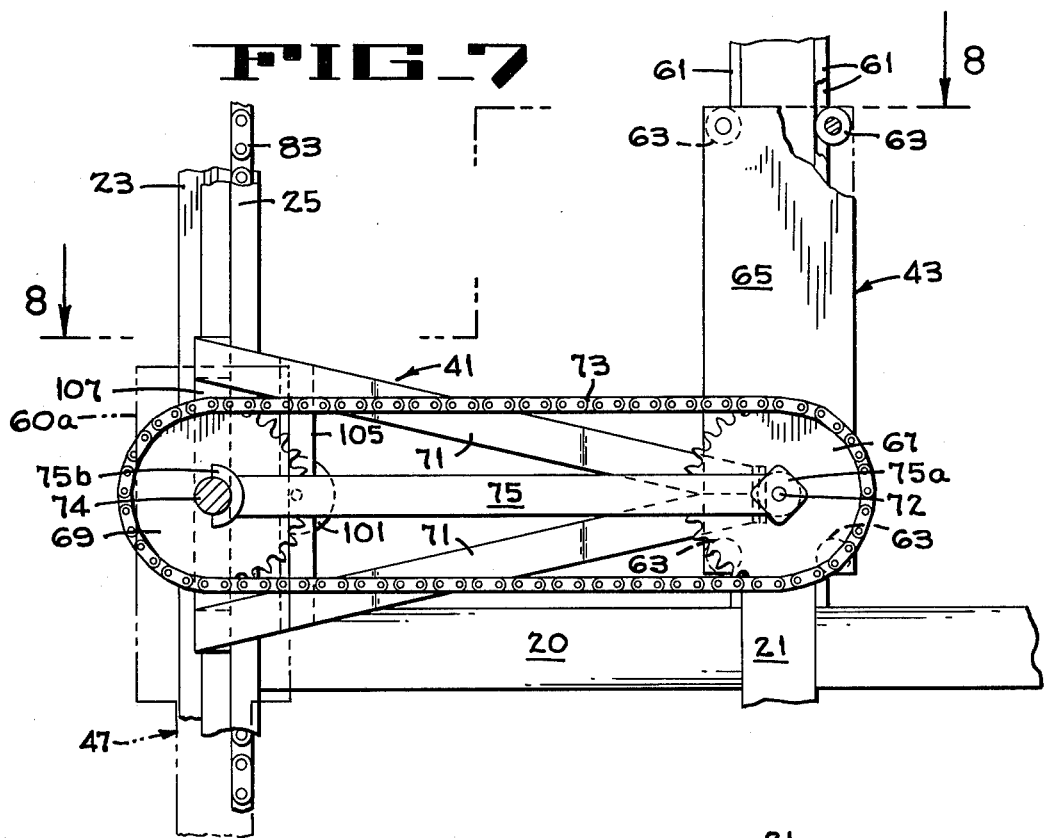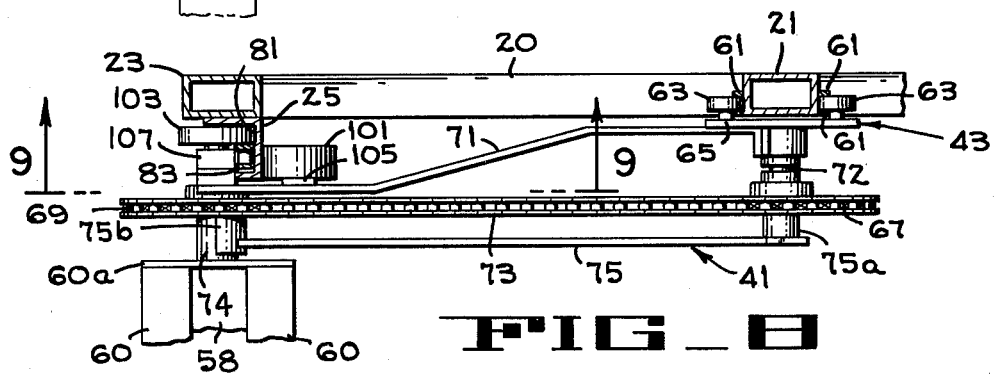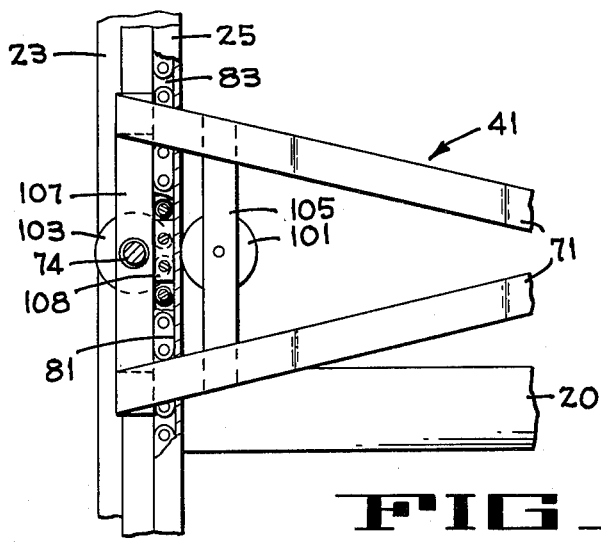

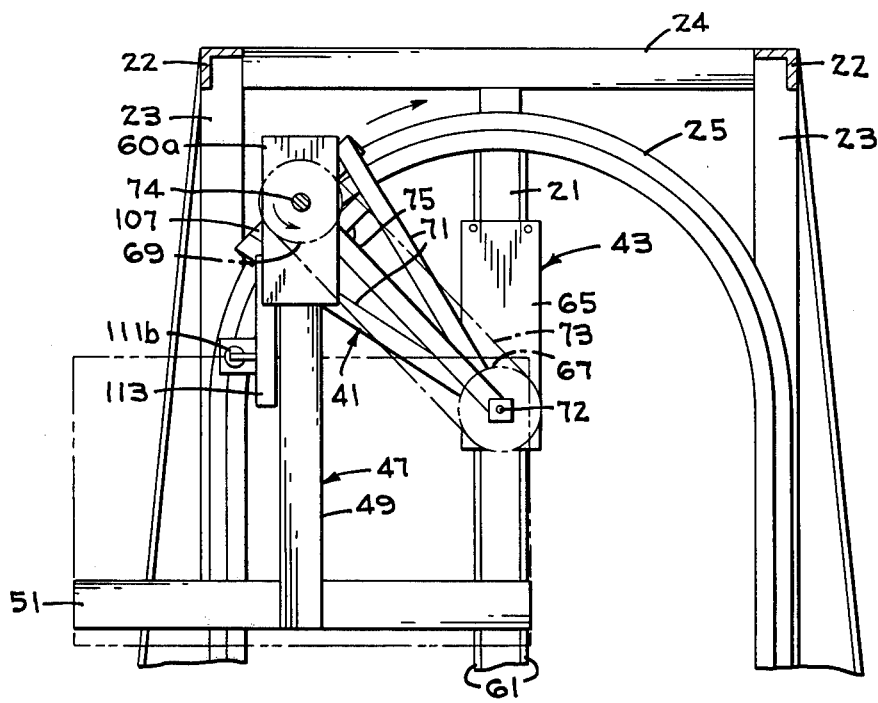
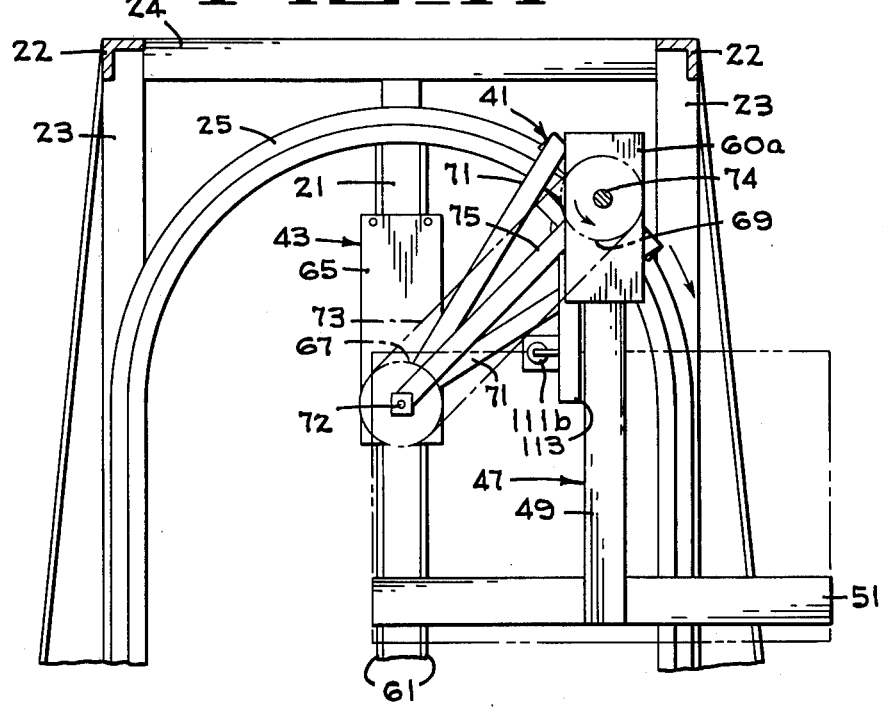

BIN DESTACKER AND RESTACKER

BACKGROUND OF THE INVENTION

1. Field of the Invention

This invention pertains to devices for transferring articles from one position to another, and more particularly, to devices for transferring large filled bins, such as fruit bins, while maintaining the vertical orientation of each bin being transferred.

2. Description of the Prior Art

Where a stack of bins, either empty or with contents therein, is to be transferred from one position to another, it is often necessary to perform this operation in a limited amount of space or, especially where the bins transferred are not empty, to maintain the orientation of each bin being transferred To be sure, the prior art literature is replete with devices for transferring bins or open boxes so as not to spill the contents thereof. An example is U.S. Pat. No. 1,290,675 to Stiebler et al which discloses a machine that uses a pivotable pair of clamping feet to maintain the vertical orientation of the bin being transferred. In the Stiebler et al patent, as in many later issued patents, the disclosed machines are operated so that the bins or boxes must be transferred vertically upward by separate conveying means to a position where they may be engaged by the clamping feet, thus increasing the complexity of the apparatus and/or requiring an inordinate amount of room to perform the total transfer function.

Another example of a prior art teaching is U.S. Pat No. 2,258,461 to Marsden et al, which also discloses a machine that includes separate vertical conveying means to bring the bins or boxes to be transferred to a suitable height for gripping by the clamping means of a horizontal transport mechanism.

U.S. Pat. No. 2,590,225 and 2,676,697 to Bashore disclose devices that use an imaginative approach to the problem of providing pivot means for maintaining the vertical orientation of the bin being transferred; but here, too, a separate vertical conveyor is necessary to bring each bin to the proper height for gripping and horizontal transfer.

Of course, if the bins are empty and one is not concerned with maintaining the upright orientation of the bins transferred, many devices exist which both transfer and invert the bin so that the bottom becomes the top and conversely. Examples of this are to be found in U.S. Pat. No. 2,578,603 to Rothman and U.S. Pat. No. 2,583,490 to Orlando.

SUMMARY OF THE INVENTION

The present invention concerns apparatus for destacking and restacking bins or other types of containers wherein one conveying device performs the operations of vertical conveyance and horizontal conveyance of each bin while maintaining the upright orientation of each bin being transferred, the entire operation being performable in a minimum amount of space.

The apparatus of the present invention includes a frame, a pair of pivot arms rotatably mounted at their inner ends to the frame so that the arms extend in a spaced parallel relationship, and a container clamping assembly rotatably secured to the outer ends of the pivot arms. At least one of the pivot arms has a stationary sprocket at its inner end and a rotatable sprocket at its outer end. An endless chain is received about the sprockets on such arm. The container clamping assembly is rigidly connected to the rotatable sprocket, thereby causing the clamping assembly to rotate in response to the rotation of the arms. Means are provided for rotating the arms about the stationary sprocket when a container is held by the clamping assembly, including chains which are secured to the outer ends of the pivot arms and means for constraining the chains to move in parallel arcuate paths at the top of the apparatus, whereby the container is transferred from one end to the other end of the apparatus without disturbing its initial orientation.

In a preferred embodiment the apparatus further comprises means for mounting the inner ends of the pivot arms and the stationary sprocket for vertical travel on the frame means. The apparatus may also comprise means carried by the clamping assembly for sensing when a container may be clamped, thereby facilitating the engagement of the container by the clamping assembly, and also facilitating the stopping and reversing of the means for rotating the pivot arms.

It is a primary object of the present invention to provide a container destacking and restacking apparatus in which the vertical conveyance and horizontal conveyance of the containers is performed by a single conveyance means which maintains the vertical orientation of each container being transferred and which performs the transfer operation in a minimum amount of space.

The invention, together with additional objects and advantages thereof, is best understood by reference to the following description of the preferred embodiment, as illustrated by the accompanying drawings.

BRIEF DESCRIPTION OF THE DRAWINGS

FIG. 1 is a side elevation view of the stacking and destacking apparatus of the present invention with a stack of bins being shown in position therein prior to being destacked.

FIG. 2 is an end elevation view of the apparatus of FIG. 1.

FIG. 4 is a section taken along line 4—4 of FIG. 3.

FIG. 5 is a section taken along line 5—5 of FIG. 4 and showing one of the clamp assembly means.

FIG. 6 is a section taken along line 6—6 of FIG. 5 and shows, in phantom lines, alternate positions of the clamping pads.

FIG. 7 is an enlarged section taken along line 7—7 of FIG. 4 and showing one of the pivot arms.

FIG. 8 is a section taken along line 8—8 of FIG. 7.

FIG. 9 is a section taken on line 9—9 of FIG. 8 showing a portion of the outer end of one of the pivot arms, particularly showing its connection with the outer vertical guideway portion of the frame.

FIG. 10 is an elevational view of the upper end of the stacking and destacking apparatus of the present invention showing the pivot arm in a partially rotated, forward position just prior to the transfer of a bin through the apparatus.

FIG. 11 is an elevational view of the upper end of the apparatus similar to FIG. 10 but showing the pivot arm in a rearwardly rotated position just after the transfer of a bin through the apparatus.

DESCRIPTION OF THE PREFERRED EMBODIMENT

Figure 3:
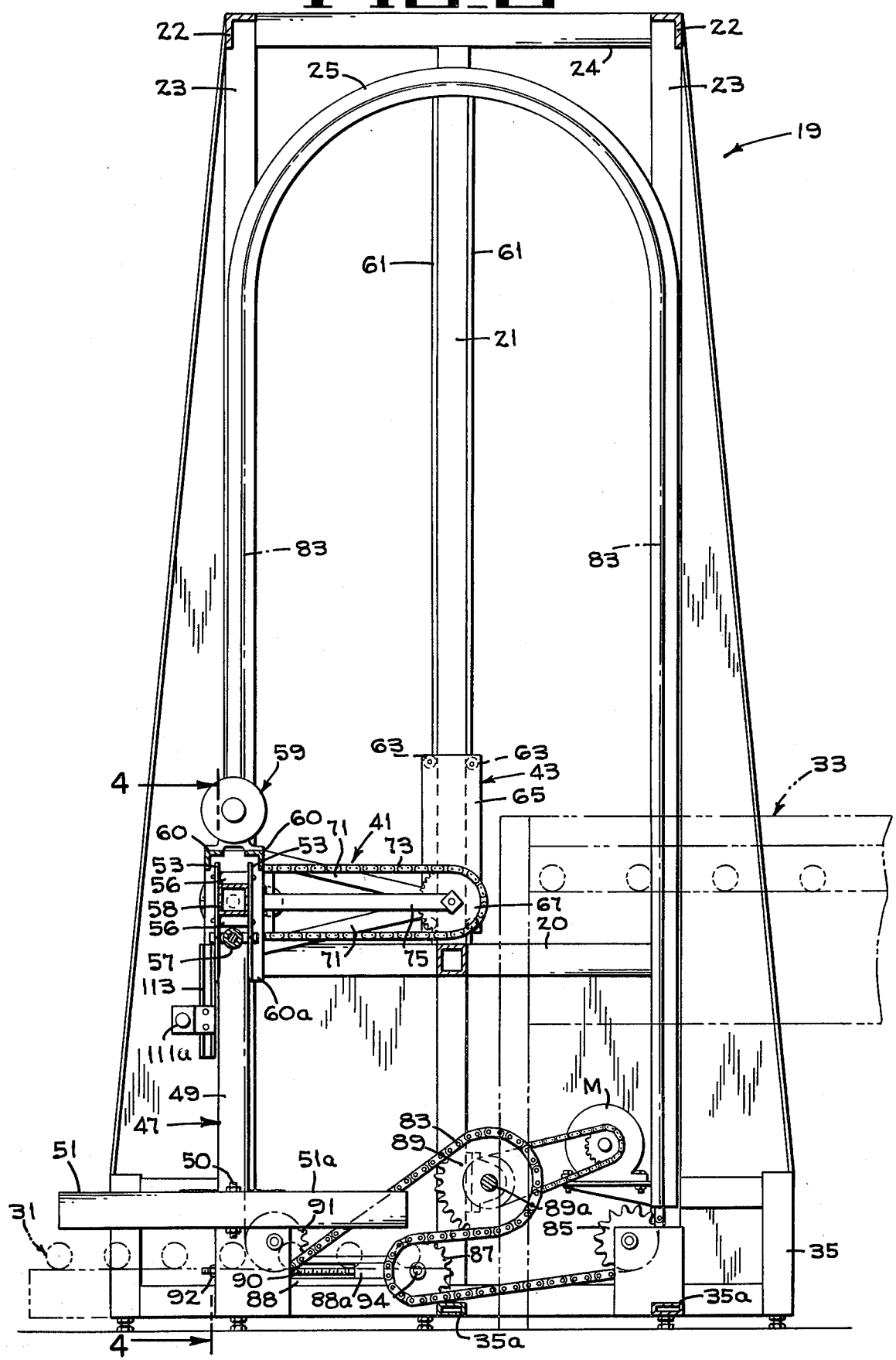
FIG. 3 is an enlarged vertical section taken along line 3—3 of FIG. 2.

FIG. 1 generally depicts the stacking and destacking apparatus 19 of the present invention, showing a part or all of many of the elements thereof, and illustrates the machine in its stacking arrangement wherein a stack of bins 29a, 29b, 29c and 29d are in position to be sequentially destacked and individually fed to a take-off conveyor 33. The frame of the apparatus generally comprises an outer, load-bearing structure comprising four upright supports 23 located at the corners of the apparatus and being interconnected by horizontal beams 22 and 24 at the top (FIGS. 1 and 2) and by horizontal beams 20 (FIG. 1) at the lower ends thereof. Central support and guide posts 21 extend vertically on each side of the frame between the supports 23, as shown in FIG. 1. On each side of the frame structure there is also provided an inverted U-shaped frame structure 25 that is located adjacent to and supported by the upright supports 23. Each of the U-shaped frame structures 25 functions as a guideway and load support for the outer end of a pivot mechanism 41 to be described in more detail hereinafter. The upright supports 23 and guide posts 21 are tied together at the bottom of the structure by base beams 35 interconnected by transverse braces 35a (FIG. 2).

The posts 21 on each side of the frame function as guideways for the vertical movement of the inner ends of the pivot arm mechanisms 41 and, in particular, support frame elevator guide means 43 which carry the inner ends of said pivot arm mechanisms. The control panel 45 for the apparatus of the present invention is conveniently located on one side of the machine (FIG. 1) in such a position as not to interfere with the movement of the sequence of stacked 29a, 29b, 29c and 29d (FIG. 1) into and through the machine. On the discharge side of the apparatus, the take-off conveyor 33 may be backed up within the frame of the apparatus as shown in FIG. 1. A second conveyor 31 may be moved into position within the machine frame at the front side of the apparatus to deliver the sequence of bins thereto.

FIGS. 2 and 4 depict the interior of the stacking and destacking apparatus, viewed end on. As can be readily seen, a pair of clamp assembly means 47 are provided at each side of the structure and are used to grasp and lift bins, one at a time, from one end of the apparatus to the other. Each clamp assembly means comprises a vertical beam 49 having a clamping foot 51 pivotally attached to the lower end thereof with a resilient clamping pad 51a being secured to the inner face of the foot for engagement with the side of a bin to be lifted. Each beam 49 is attached at its upper end to a pair of spaced plates 53 (FIG. 5). The clamp assemblies are arranged to be movably supported at their upper ends by rollers 56 (FIGS. 4 and 5) which extend between the plates 53 and which are received about a transversely oriented support beam 58. One set of plates 53 (FIG. 4) is connected to a piston rod 55 and the other set of plates is connected to the hydraulic cylinder 57 that receives the rod so that the clamp assembly means can be moved together or apart. A conventional hydraulic power unit 59 is positioned atop a pair of angle irons 60 that extend transversely across the machine and are supported by a pair of plates 60a secured to the ends of the support beam 58. The power unit 59 provides the power to move the piston rod 55 within cylinder 57 and thereby move the clamp assemblies 47 in and out, the upper ends thereof being guided by rollers 56 which roll along the upper and lower faces of the transversely oriented beam 58 with the vertical orientation of the beams 49 being maintained throughout this motion. The power unit 59 is provided wih conventional pressure sensing means (not shown) so as to automatically cut off when the clamping feet 51 encounter resistance to further inward motion, as would obviously occur when said clamping feet encounter a bin placed therebetween. As shown in FIG. 6, each clamping foot 51 is rotationally mounted on the lower end of the associated vertical beam 49 by means of a bolt 50. Two opposed springs 52 are connected to each clamping foot so that the foot can easily adapt to a misoriented bin, i.e., one with its sides not parallel with the sides of the apparatus.

FIG. 3, and particularly FIGS. 7-9, show in detail one of the pivot arm mechanisms 41 and its associated frame elevator guide means 43 which (by means to be disclosed in greater detail hereinafter) support the clamp assemblies 47 for vertical movement. The guide means 43 is arranged to be moved vertically on the central guide posts 21, said posts containing oppositely directed, vertically oriented, channel-shaped guideways 61 as shown in FIGS. 7 and 8. Each frame elevator guide means 43 includes four rollers 63 which are journaled at the corners of and supported by a guide plate 65 and which are arranged to be freely moved vertically in the guideways 61 on the associated guide post 21.

Each pivot arm meachanism 41 comprises a stationary sprocket 67 rigidly mounted in spaced parallel relationship (FIG. 8) to the associated guide plate 65 by means of a stub shaft 72. A beam 75 extends outwardly of the sprocket in a generally parallel plane with the inner end of said beam being rotatably connected to the sprocket 67 by means of a hub 75a rotatably secured on the projecting end of the stub shaft. The outer end of beam 75 is provided wih a bushing 75b rotatably positioned against a stub shaft 74 (FIG. 7) which carries a rotatable sprocket 69 that is set-screwed thereto. The rotatable sprocket 69 is of the same diameter as the stationary sprocket 67, and an endless chain 73 extends about the sprockets 67 and 69. Two cross beam members 71 and rotatably mounted upon the inner stub shaft 72 adjacent the guide plate 65 and extend generally outwardly to positions above and below the rotatable sprocket 69 where they are connected by a support brace 107. A second support brace 105 connects the cross beam members 71 inwardly of the sprocket 69 and serves to further rigidify the pivot arm mechanism structure. A pair of rollers 103 and 101 are mounted for rotation on the stub shaft 74 and support brace 105, respectively, with the outer roller being received in a channel guideway 81 formed as the outer face of the associated U-shaped frame structure 25 and with the inner roller being arranged to ride upon the inner face of such frame structure (FIG. 8), the rollers thereby guiding the outer end of the pivot arm mechanism 41. The clamp assemblies 47 are supported by the stub shafts 74 which are rigidly secured to the side plates 60a adjacent the suport beam 58, and the pivot arm mechanisms 41 support the stub shafts 74 for vertical movement by means of rotatable connections with the support braces 107 (see FIG. 9).

A chain 83 (FIG. 7-9) is contained within and guided by each of the guideways 81 of the U-shaped frames 25 (FIG. 8) for the purpose of moving the pivot arm mechanisms 41 vertically within the apparatus. As best shown in FIG. 3, the chain 83 passes over and is kept taut by four separate rotatable sprockets 85, 87, 89 and 91 rotatably secured to the frame structure at the lower end thereof. The chains are driven through the sprockets 89 which are secured to a drive shaft 89a arranged to be driven by a motor M. Each chain is attached to the outer end of the associated pivot arm mechanism 41 by means of a block 108 secured to the vertical support brace 107 (FIG. 9). As the outer end of a pivot arm mechanism 41 is moved only in the vertical direction in response to the motion of the chain 83, the inner portion of the pivot arm mechanism, including the stationary sprocket 67 and the frame elevator guide means 43, will also be caused to move an equal amount in the vertical direction with the beam 75 being maintained in a horizontal orientation. When the center of the stationary sprocket 67 reaches its uppermost position as shown in FIG. 10, the outer ends of the pivot arm mechanisms being to swing in an arc and the frame elevator means 43 terminate their movement upward. From this point on, the pivot arm mechanisms 41 pivot about the axis of the stationary sprockets 67 through an arcuate path of 180 degrees.

Slack in the chain 83 may be taken up by the sprocket 87 which is horizontally movable relative to the frame (back to front) along a track 88 (FIG. 3) by means of a bolt 90 that is attached to the frame at one end thereof by a nut 92 and that is also threaded to a slide member 88a received in track 88 and secured to the stub shaft 94 which rotatably receives the sprocket 87. Thus, rotation of the nut 92 to move the slide member 88a within track 88 will move the sprocket 87 to cause a tightening or loosening of the chain.

With reference to FIG. 2, a combined light source and photoelectric detector 111a and appropriately oriented reflector 111b are mounted on vertical supports 113 that are hung on the lower ends of the side plates 60a (FIG. 5) parallel to and adjacent to the vertical beams 49 of the clamp assembly means 47. As soon as the clamp assembly means, and therefore the photoelectric devices 111, move down below the top of the uppermost bin 29a (FIG. 1) in the inlet portion of the apparatus, the light beam sent and received by 111a is interrupted and an appropriate conventional control circuit (not shown) can be utilized to stop the drive to the motor M. Thus, the apparatus senses that the clamping feet 51 are in position to clamp and lift said uppermost bin 29a.

FIGS. 10 and 11 illustrate the rotational motion which the pivot arm mechanisms 41 undergo at the top of the U-shaped frames 25 where the outer ends of the pivot arm mechanisms are moving in the arcuate part of the frames under the urging of the chains 83. When the axis of the stationary sprocket 67 reaches a point in a horizontal plane with the start and end of the arcuate track section, the horizontal movement of the outer end of a pivot arm mechanism keeps the associated frame elevator means 43 from moving any further upwardly. However, the chain 83 continues to move around the upper portion of the guideway 81 with the result that the outer end of the pivot arm mechanism, including the rotatable sprocket 69, follows the path of the chain 83 and the pivot arm mechanism pivots about the center of the now stationary sprocket 67. The stationary sprocket 67 is not free to rotate; thus, the chain 73 carried thereon is upwrapped at one side and wrapped at the other in response to the changing relative position of the rotatable sprocket 69. In response to this, the rotatable sprocket will revolve slowly as the pivot arm mechanism rotates about the axis of sprocket 67. The radii of the stationary sprocket 67 and rotatable sprocket 69 having been chosen to be equal, the rotatable sprocket 69 will rotate by precisely the same angular amount (but in the opposite direction as shown in FIG. 10) by which the outer end of the pivot arm mechanism 41 rotates as it follows the chain around the upper part of the U-shaped frame 25. The result of this is that the vertical beams 49 of the clamping assemblies will be held in a vertical position irrespective of the degree of rotation of the pivot arm mechanisms. FIGS. 10 and 11 indicate two different positions for a pivot arm mechanism 41, a "forward" position and a "rearward" position, respectively. It will be noted that the clamp assembly vertical beam 49 is maintained in a vertical orientation for each position. If a bin is clamped between the clamp assembly feet 51, then it follows that it will be maintained in its original upright position as the pivot arms move up and over the top portion of the U-shaped frames 25. Thus, not only empty bins, but also bins with contents therein may be destacked or restacked by use of the subject invention.

The operation of the subject invention as a destacker proceeds as follows. With reference to FIG. 1, the stack of bins 29a-29d is moved in from the left via the conveyor 31 and comes to rest at the end of such conveyor in position as shown. As appropriate sensing switch (not shown) can be positioned in the path of the stack to sense this condition and to connect power to the motor M to drive the chains 83 so as to lower the clamping mechanisms 47 until the photoelectric device 111a (FIG. 2) senses the top of the uppermost bin 29a in the stack. AT this point a signal from the detector 111a can be utilized to switch off power to motor M and thereby stop the movement of the clamping assemblies. Simultaneously therewith, a signal can be fed to the power unit 59 to activate it to move the rod 55 within the hydraulic cylinder 57 so as to bring the clamping feet 51 into firm engagement with the sides of the uppermost bin 29a. Upon sensing sufficient pressure in the hydraulic cylinder the movement of the piston rod is stopped and a signal is fed to motor M to reverse its drive. Thus, the clamp assemblies are now moved upward, carrying the uppermost bin, while still maintaining it in its original upright position. When the frame elevator guide means 43 reach their uppermost position on the center support posts 21, further upward motion of said means ceases and the outer end of the pivot arm mechanisms 41 continue to move in response to and following the motion of the chains 83 carried in the guideways 81. As soon as the outer ends of the pivot arm mechanisms 41 have rotated through 180 degrees, the frame elevator guide means begins to move vertically downward, following the motion of the outer end of the pivot arm mechanisms. When the bottom of the bin 29a engages a sensing switch actuator 130 (FIG. 1) on the take-off conveyor 33, a signal is sent to stop the motor M and to cause the clamping assemblies 47 to open to release the bin. Thus, with the apparatus in this position, the bin is deposited on the conveyor 33 which can be continuously operated to carry the bin elsewhere. As the hydraulic cylinder comes to its full extended position, a signal can be sent to again start the motor M in a forward direction (i.e., the reverse of the direction it has just been moving) to repeat the aforedescribed sequence until each of the bins 29b, 29c and 29d have been similarly moved onto the conveyor 33.

When the apparatus 19 of the present invention is to be used as a restacker the positions of the infeed conveyor 31 and take-off conveyor 33 can be reversed so that singulated bins are fed to the apparatus to be formed into stacks of bins on the discharge side. The operation on the pick-up, or input, side can be exactly the same as that heretofore described with respect to the destacking operation whereby the photodetector 111a senses the top of a bin to permit the clamping assemblies 47 to grip the lower end thereof. On the discharge side, in place of the sensing switch actuator 130, a second photodetector (not shown) can be utilized to detect the top of a bin lower than that being gripped by the clamping assemblies so that the clamping assemblies will be caused to come to a stop at the proper elevation to allow the gripped bin to be deposited atop a previously delivered bin or stack of bins. The second photodetector would thereby be hung at an elevation so that it would sense in a parallel plane just below a bin being held by the clamping assemblies, and conventional control circuitry can be utilized to stop the movement of the clamped bin when the second photodector thus senses a bin beneath it.

Although the best mode contemplated for carrying out the present invention has been herein shown and described, it will be apparent that modification and variation may be made without departing from what is regarded to be the subject matter of the invention.

What is claimed is:

1. An apparatus for stacking or destacking containers comprising frame means, a pair of pivot arms, means rotatably mounting one end of each of said pivot arms to said frame means so that said pivot arms extend in spaced parallel relationship, a first sprocket mounted adjacent said one end of one of said pivot arms and being secured against rotation relative to said frame means, a second sprocket rotatably secured to the other end of said one pivot arm, an endless chain received about said first and second sprockets, container clamping means rotatably secured to said other ends of said pivot arms and being rigidly connected to said second sprocket, means for moving said clamping means apart and together to clamp a container therebetween, means for rotating said pivot arms about the axis of said first sprocket when a container is clamped by said clamping means to transfer said container from one end of the apparatus to the other while the orientation of said container is undisturbed, said means for rotating said pivot arms comprising chains secured to said other ends of said pivot arms, and means constraining said chains to move in parallel arcuate paths at the top of said apparatus.

2. An apparatus according to claim 1 including means carried by said clamping means for sensing a container between said clamping means to thereby cause said clamping means to move into engagement with said container and to thereby stop and reverse the direction of movement of said means for rotating the pivot arms.

3. An apparatus according to claim 1 including means mounting said one ends of said pivot arms and said first sprocket for vertical travel on said frame means.

* * * * *

UNITED STATES PATENT AND TRADEMARK OFFICE
CERTIFICATE OF CORRECTION

PATENT NO. : 4,036,375

DATED : July 19, 1977

INVENTOR(S) : Wayne L. McClintic et al.

It is certified that error appears in the above-identified patent and that said Letters Patent are hereby corrected as shown below:

Column 1, line 37, "Pat." should be --Patents--.

Column 3, line 37, "sequence" should be --sequences--.

Column 4, line 32, "wih" should be --with--.

Column 5, line 13, "being" should be --begin--.

Column 6, line 22, the second "As" should be --An--.

Column 6, Line 28, "AT" should be --At--.

Signed and Sealed this

Thirteenth Day of March 1979

[SEAL]

Attest:

RUTH C. MASON
Attesting Officer

DONALD W. BANNER
Commissioner of Patents and Trademarks